June 5, 1945.  R. G. LE TOURNEAU  2,377,701
CONTOUR CUTTING LATHE
Filed Dec. 18, 1942  5 Sheets-Sheet 1

INVENTOR
R. G. Le Tourneau
BY
ATTYS

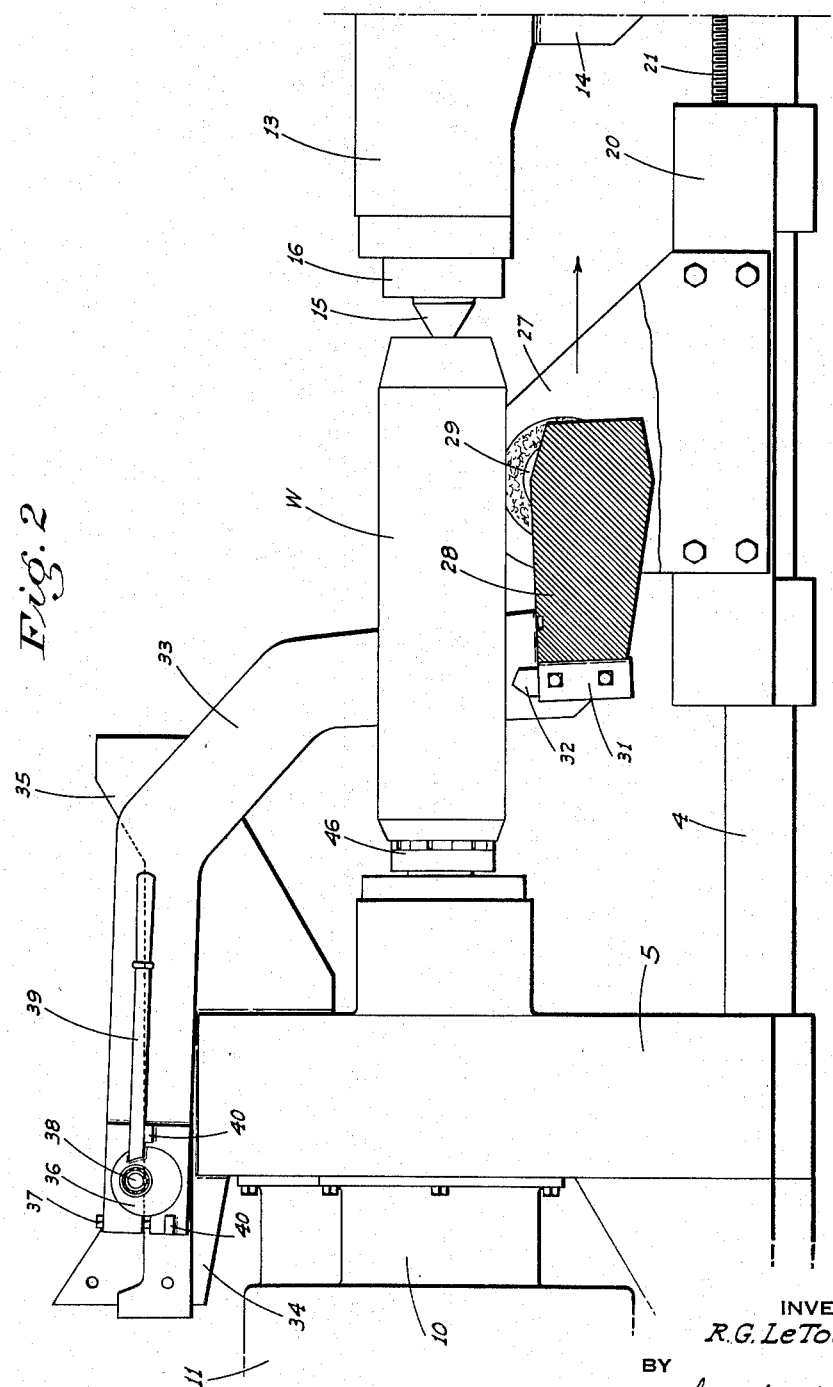

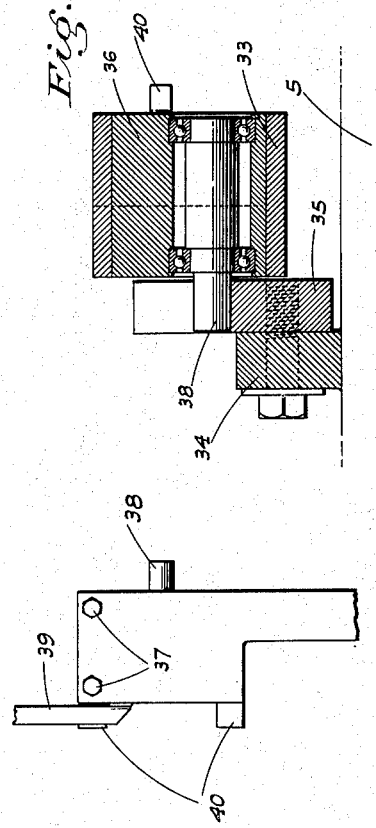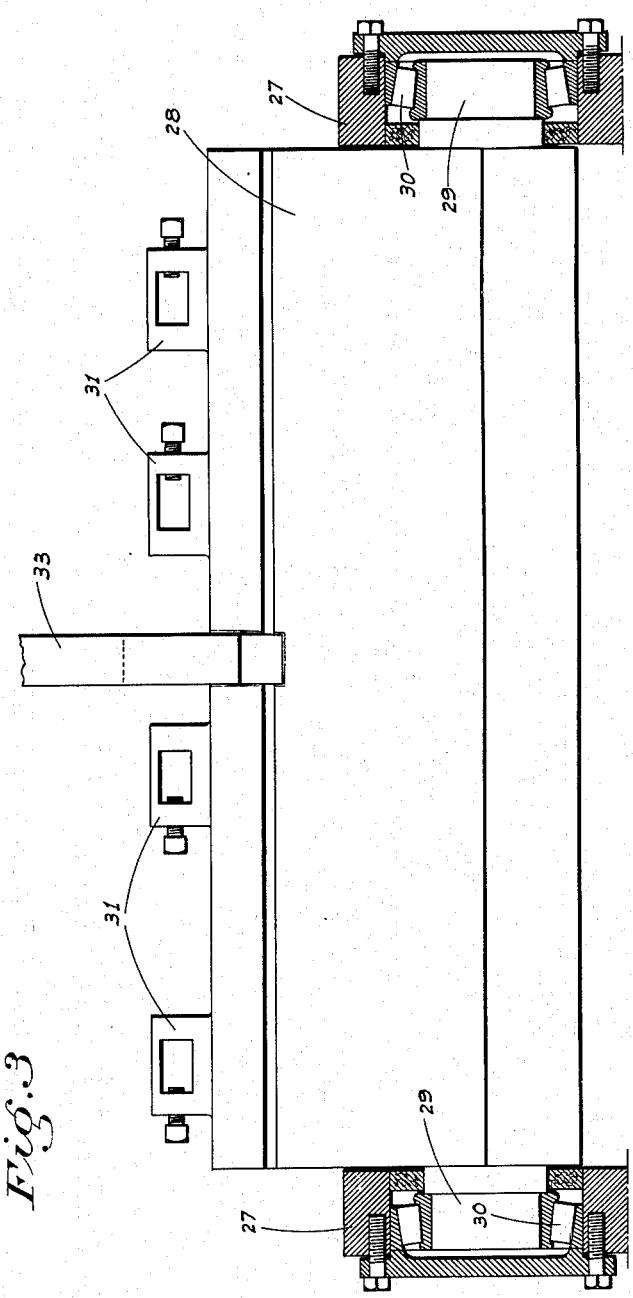

June 5, 1945.   R. G. LE TOURNEAU   2,377,701
CONTOUR CUTTING LATHE
Filed Dec. 18, 1942    5 Sheets-Sheet 4

INVENTOR
R. G. LeTourneau
ATTYS

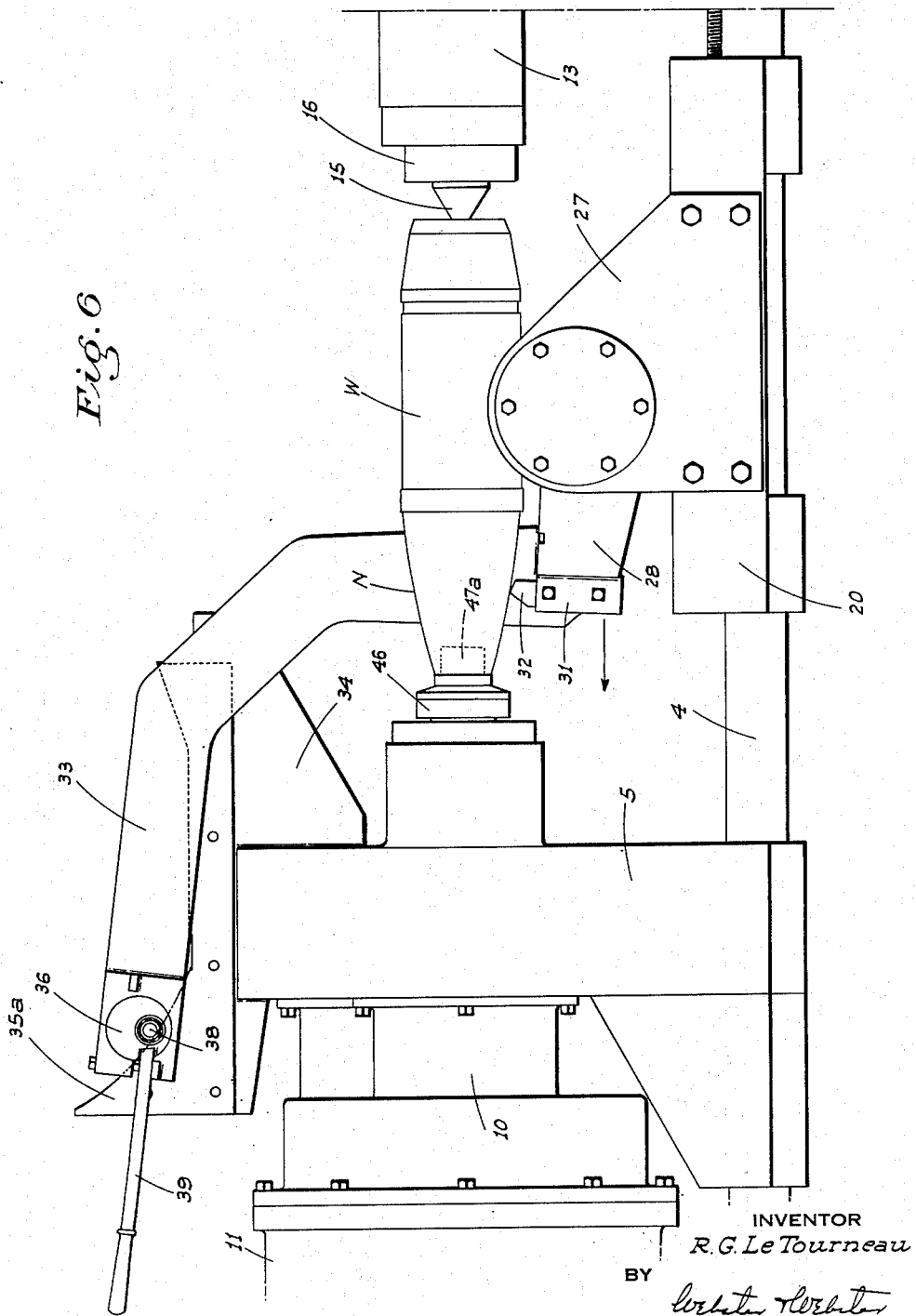

Patented June 5, 1945

2,377,701

UNITED STATES PATENT OFFICE 2,377,701

CONTOUR CUTTING LATHE

Robert G. Le Tourneau, Peoria, Ill., assignor to R. G. Le Tourneau, Inc., Stockton, Calif., a corporation of California Application December 18, 1942, Serial No. 469,441

5 Claims. (Cl. 82—14)

This invention relates in general to a semi-automatic machine lathe operative to cut an exterior contour on cylindrical work; the lathe being especially designed for exterior contour machining of ordnance shells.

In particular the invention is directed to, and it is the principal object to provide, a lathe of the type described which includes, in combination with a movable tool-holding bar, unique cam responsive means to effect movement of the tool-holding bar and consequently control the contour of the cut made by the tool as it advances along the work.

Another object of this invention is to provide a lathe which includes, in combination, a transversely extending, vertically swingable tool-holding bar mounted on a longitudinally movable carriage, the bar extending beneath the work and the tool projecting upwardly for engagement therewith, and a rigid control arm extending from the tool-holding bar upwardly and longitudinally to a point adjacent and above the headstock; there being a rigid longitudinal cam fixed in upwardly facing relation in connection with and above the headstock, said control arm having an element thereon riding said cam.

An additional object of the invention is to provide a lathe, as in the preceding paragraph, in which said cam engaging element is mounted on the control arm for relative vertical adjustment, whereby to shift the tool-holding bar in a direction to either engage the tool with the work at the beginning of a cut, or retract the tool from the work at the end of a cut for the purpose of permitting the tool to run back clear of the work to starting position; a hand lever being arranged to effect such relative vertical adjustment of the cam engaging element.

It is also an object of the invention to provide unique instrumentalities associated with the mandrel and driving head of the lathe to correctly position the work, which is hollow and open at the end adjacent said mandrel, longitudinally of the lathe and relative to the adjacent cutting tool, upon advancing movement of the tailstock center pin and resulting movement of the work into engagement with said driving head.

A further object of the invention is to produce a relatively simple, but exceedingly effective, device which will be suitable for the purpose for which it is designed.

These objects I accomplish by means of such structure and relative arrangement of parts as will fully appear by a perusal of the following specification and claims.

As manufactured the lathe is of multiple-spindle type, but for the purpose of simplicity and clarity the lathe is herein described—except where otherwise indicated—as a single-spindle lathe.

In the drawings similar characters of reference indicate corresponding parts in the several views:

Figure 2 is an enlarged fragmentary elevation, partly in section, showing in detail the tool-holding bar, bar control arm, and cam arrangement which actuates said arm, and with the tool being retracted.

Figure 3 is a fragmentary plan view illustrating the tool-holding bar as constructed for a multiple-spindle lathe.

Figure 4 is an enlarged fragmentary cross section on line 4—4 of Fig. 1.

Figure 6 is an enlarged fragmentary elevation showing a modified form of cam.

Figure 1:
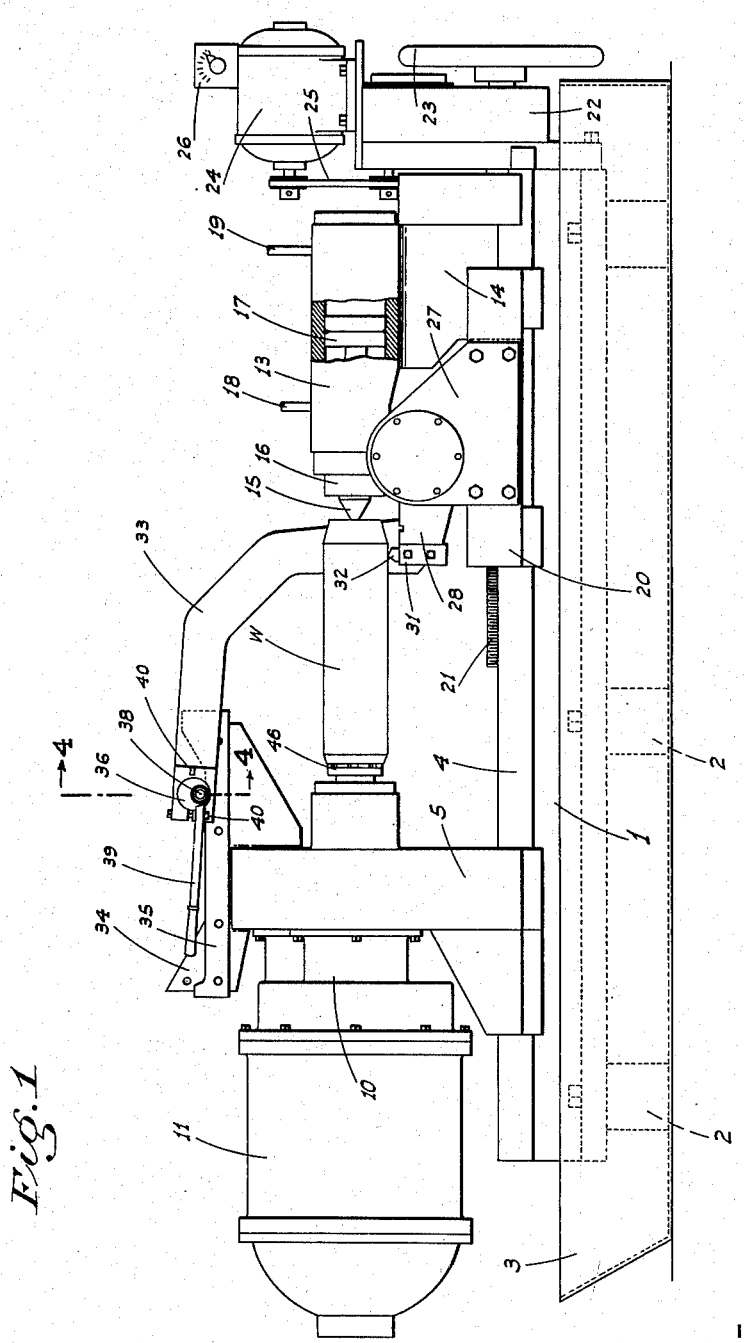
Figure 1 is a side elevation of the lathe with the work in position and with the tool being advanced.
Figure 5:
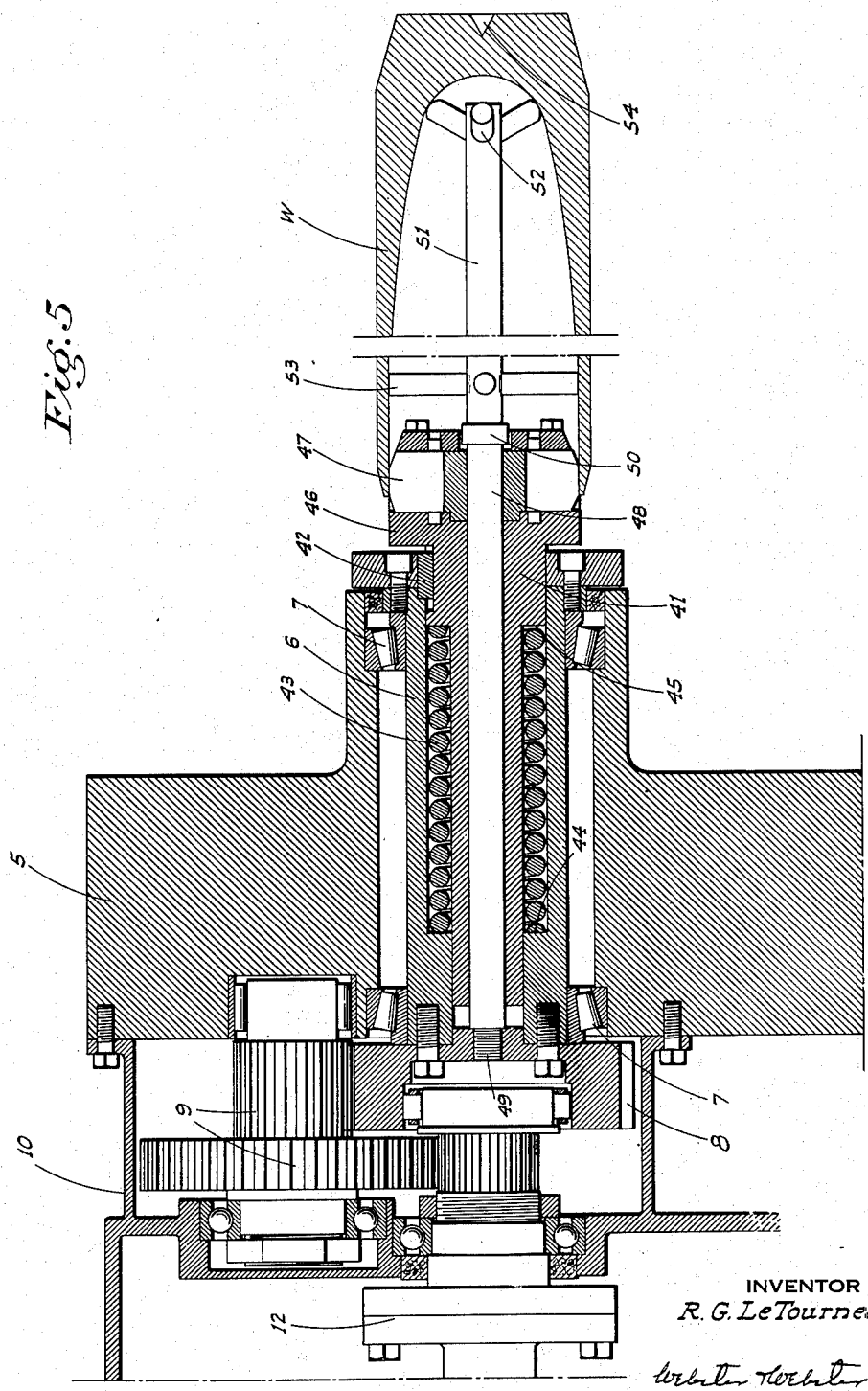
Figure 5 is an enlarged fragmentary sectional elevation of the headstock, together with the mandrel and driving head, as mounted on the headstock spindle.

Referring now more particularly to the characters of reference on the drawings, the lathe comprises a rigid horizontal bed 1 supported by feet 2 in a catch pan 3; the bed including longitudinally extending transversely spaced ways 4. A headstock, indicated generally at 5, is rigidly mounted on the bed. A spindle 6 is rotatably mounted in the headstock 5 by means of anti-friction bearings 7. A mandrel and driving head assembly is arranged in connection with spindle 6 in the manner hereinafter described in detail.

At its rear end the spindle 6 is fitted with a gear 8 which is in mesh with and driven by a gear train, indicated generally at 9; said gear train being enclosed within a suitable gear housing 10. An electric motor 11 is mounted in connection with the outer end of gear housing 10 and drives gear train 9 through the medium of a coupling 12.

Adjacent the end of the lathe opposite the headstock 5 a fluid-operated tailstock 13 is supported by a rigid mount 14 secured to the bed of the lathe; this fluid operated tailstock including a live center pin 15 carried in a sliding quill 16 which is advanced or retracted by a piston 17 within the cylinder of the tailstock. Suitable fluid pressure conduits 18 and 19 lead to opposite ends of the tailstock cylinder from a valve-controlled source of supply (not shown).

A longitudinal movable carriage 20 is mounted on ways 4 between the headstock and tailstock and is advanced or retracted by a feed screw 21. The feed screw 21, which extends longitudinally of the lathe between the ways, is actuated from a conventional gear box 22 mounted on the lathe outwardly of the tailstock; the gear box including an exposed hand wheel 23 for manual operation of the feed screw 21. The feed screw is normally driven through the medium of the gear box by means of a drive motor 24 mounted on top of said gear box and coupled with the latter by means of a pulley and belt assembly, indicated generally at 25. The motor 24 includes a speed regulator 26.

A bracket 27 is rigidly secured to and upstands from each end of the carriage 20 and a transverse, heavy-duty tool-holding bar 28 extends between such brackets. Stub shafts 29 project from the ends of the tool-holding bar and are journaled in bearings 30 suitably mounted in said brackets. At its forward edge the tool-holding bar 28 includes a tool socket 31 for each spindle which the lathe may embody, and such socket removably carries an upwardly projecting tool 32.

A tool bar control arm 33 is fixed at one end on the tool-holding bar 28 intermediate the ends of the latter. Such arm extends upwardly in laterally offset relation to the adjacent live center pin 15 and thence extends forwardly to a point adjacent, but in a plane above, the headstock 5. A vertically longitudinally extending cam holding plate or bracket 34 is fixed on the headstock and projects thereabove, and a similarly disposed cam 35 is detachably bolted to the plate 34; the upper edge of said cam being of a length and having such a contour as to cut the work to exactly the contour desired.

At its upper and forward end the tool bar control arm 33 is split and encircles a cylindrical head 36, whose axis is transverse and horizontal, and which head is frictionally but turnably clamped in place by means of clamping bolts 37. The upper and forward portion of arm 33 lies lengthwise of and adjacent the cam 35, and a cam roller 38 is journaled in head 36 parallel but eccentric to the axis thereof; said roller projecting over and resting on the cam 35. A substantially radially projecting hand lever 39 is fixed on head 36 on the side opposite the cam, and stops 40 limit movement of the lever to approximately one-half turn of the head 36, whereby to selectively shift said roller between a lowered and a raised position.

The mandrel and driving head assembly which is mounted in connection with the headstock spindle 6 comprises the following:

The mandrel indicated at 41 is disposed within and extends substantially the full length of the spindle 6; the mandrel and cylinder being keyed together in driving relation, as at 42, and also to permit of limited longitudinal movement of the mandrel. A heavy-duty helical compression spring 43 surrounds the mandrel within spindle 6 and engages between an annular shoulder 44 on the spindle and an annular shoulder 45 on the mandrel.

At its outer end and exteriorly of the spindle 6 the mandrel 41 is fitted with a circular driving head 46 which includes an expanding chuck unit of suitable form and indicated generally at 47.

The mandrel 41 includes a central bore to opposite ends thereof and through which a rod 48 extends; the inner end of the rod being threaded, as at 49, centrally into gear 8. The outer end of rod 48 is formed as a stop head 50 which is normally spaced slightly from the driving head to limit outward axial movement of the latter and the mandrel.

*Operation*

The above described lathe is designed for exterior contour machining of cylindrical, hollow work W, which is open at one end, and here shown as an ordnance shell in the course of manufacture. A longitudinal spacer rod 51 is dropped into the hollow work from its open end and before the work is placed in the lathe; such spacer rod at the inner end including centering legs 52 which seat in the bottom of the hollow work, and intermediate its ends carries a centering spider 53 which engages the inner wall of the work adjacent its open end. With the spacer rod in place in the work, the latter is engaged between the live center pin 15 of the tailstock and the driving head 46 which projects into the open end of said work to permit of gripping of the latter by the expanding chuck 47. The live center pin engages the work at the adjacent end in a preformed taper seat 54, and upon actuation of the fluid operated tailstock in a direction to advance the center pin 15, the work is forced longitudinally so that the driving head 46 properly engages in the open end of said work. The spacer rod 51 limits the extent of telescoping of the driving head into the work, whereby to assure of proper positioning of the work lengthwise of the lathe relative to the cam controlled cutting tool 32.

During the machining operation on the work the compression spring 43 constantly urges the driving head into the open end of the work. This compensates for slight variations in the length of the work so that the driving head meets and engages the work properly, even though the work is slightly long or short.

After the work has been properly positioned between the driving head and the center pin 15, the feed screw is actuated to place the tool 32 at the end of the work adjacent center pin 15; this being accomplished with the hand lever in the position shown in Fig. 2, wherein the cam roller is in its uppermost position and the tool-holding bar is consequently in lowered position with the tool clear of the work.

When the carriage has been brought to starting position the hand lever 39 is thrown to the position shown in Fig. 1, which results in lowering of cam engaging roller 38 and raising of the tool 32 into the work; the cam roller then being at the starting end of the cam 35. Thereafter the feed screw 21 is driven at regulated speed to advance the carriage toward the headstock, and the tool 32 cuts a contour on the exterior of the work exactly corresponding to the contour of the cam 35 over which the cam roller 38 is simultaneously passing. Any rise or fall in the cam 35 is imparted to the tool holding bar 28 and to the tool 32 by means of the tool bar control arm 33.

When the tool 32 has completely traversed the work the hand lever 39 is thrown back to the position shown in Fig. 2, lowering the tool from the work, and the carriage is then reversed to return it to starting position.

The cam 35 is shaped to be used with the initial machining operation on the partly formed shell from end to end thereof. Cam 35a, as shown in Fig. 6, is used for a subsequent machining operation on the shell after the nose N thereof has been pressed to the necessary curved form, as shown. In this case, the chuck 47 is removed from the driving head 46, and a smaller chuck 47a projects into the reduced size nose in gripping relation.

From the foregoing description it will be readily seen that I have produced such a device as substantially fulfills the objects of the invention as set forth herein.

While this specification sets forth in detail the present and preferred construction of the device, still in practice such deviations from such detail may be resorted to as do not form a departure from the spirit of the invention, as defined by the appended claims.

Having thus described my invention, what I claim as new and useful and desire to secure by Letters Patent is:

1. In a lathe which includes a bed, a headstock and tailstock mounted on the bed in longitudinally spaced relation, and a carriage mounted for longitudinal movement between said headstock and tailstock; a tool holding bar disposed above the carriage and extending with its axis transversely of the lathe, means mounting said bar on the carriage for up and down swinging movement about said axis, a longitudinal upwardly facing cam disposed above the headstock, means removably mounting the cam in connection with said headstock, a rigid longitudinal arm secured on said bar in laterally offset relation to the center line of the adjacent tailstock extending upwardly and forwardly, the forward end portion of the arm being disposed alongside the cam, and a cam engaging element projecting laterally from said portion.

2. Apparatus as in claim 1 in which said cam mounting means comprises a bracket plate disposed on edge and extending longitudinally of the lathe; the cam being disposed in side to side relation to said bracket plate with the cam surface above the upper edge of said plate, and bolts removably securing the cam to said plate.

3. In a lathe which includes a bed, a headstock and tailstock mounted on the bed in longitudinally spaced relation, and a carriage mounted for longitudinal movement between said headstock and tailstock; a tool holder mounted on the carriage for movement toward and away from work supported between the headstock and tailstock, a longitudinally extending cam mounted on the lathe, a tool holder control arm secured in connection with the tool holder and extending alongside the cam, a normally stationary but turnable head mounted on the arm adjacent the cam, the axis of said head extending transversely of said arm and cam, a cam engaging element projecting laterally from said head in eccentric relation to the axis thereof, and manually actuated means connecting with said head to effect limited turning thereof and corresponding movement of the tool holder relative to the work.

4. Apparatus as in claim 3 in which said manually actuated means comprises a hand lever secured to and projecting from the turnable head, and stops on the arm positioned to limit movement of the arm between a position with the tool holder moved toward the work, and a position with the tool holder moved away from the work.

5. In a lathe which includes a bed, a headstock and tailstock mounted on the bed in longitudinally spaced relation, and a carriage mounted for longitudinal movement between said headstock and tailstock; a tool holder mounted on the carriage for movement toward and away from work supported between the headstock and tailstock, a cam mounted on the lathe, an element responsive to and movable along said cam to correspondingly move the tool holder, said element being manually adjustable to effect movement of the tool holder to and from the work independent of the cam, such manually adjustable means including an arm connected with the holder and having a portion disposed parallel to and adjacent the cam, a member mounted on said arm adjacent the cam for turning movement about an axis transversely of said arm and cam, said element being secured to and projecting laterally from said member in eccentric relation to the axis of the latter, and a hand lever connected to said member.

ROBERT G. LE TOURNEAU.